United States Patent
Noviello

(10) Patent No.: US 7,702,570 B2
(45) Date of Patent: Apr. 20, 2010

(54) SYSTEM AND METHOD FOR PROVIDING AN OPERATOR INTERFACE FOR A RADAR DISPLAY OF MARKET DATA

(75) Inventor: Joseph C. Noviello, Summit, NJ (US)

(73) Assignee: BGC Partners, Inc., New York, NY (US)

( * ) Notice: Subject to any disclaimer, the term of this patent is extended or adjusted under 35 U.S.C. 154(b) by 298 days.

(21) Appl. No.: 11/686,621

(22) Filed: Mar. 15, 2007

(65) Prior Publication Data

US 2008/0228616 A1    Sep. 18, 2008

(51) Int. Cl.
G06Q 40/00    (2006.01)
(52) U.S. Cl. .......................................... 705/37; 705/35
(58) Field of Classification Search .............. 705/35–45
See application file for complete search history.

(56) References Cited

U.S. PATENT DOCUMENTS

| | | | |
|---|---|---|---|
| 5,063,604 A | 11/1991 | Weiman | 382/41 |
| 5,315,989 A | 5/1994 | Tobia | 128/204.28 |
| 5,689,651 A | 11/1997 | Lozman | 395/237 |
| 5,845,266 A | 12/1998 | Lupien et al. | |
| 6,098,051 A | 8/2000 | Lupien et al. | |
| 6,188,403 B1 | 2/2001 | Sacerdoti et al. | 345/339 |
| 6,272,474 B1 | 8/2001 | Garcia | |
| 6,421,400 B1 | 7/2002 | Rhee et al. | 375/329 |
| 6,766,062 B1 | 7/2004 | Donoho et al. | 382/240 |
| 7,523,064 B2 | 9/2004 | Burns et al. | |
| 6,856,967 B1 | 2/2005 | Woolston et al. | |
| 7,046,248 B1 | 5/2006 | Perttunen | 345/440 |
| 7,127,424 B2 | 10/2006 | Kemp et al. | |
| 7,212,999 B2 | 5/2007 | Friesen et | 705/37 |
| 7,243,083 B2 | 7/2007 | Burns et al. | |
| 7,437,325 B2 | 10/2008 | Kemp et al. | |
| 7,472,084 B2 | 12/2008 | Damschroder | |
| 7,584,142 B1 | 9/2009 | Kline et al. | |
| 2002/0123976 A1 | 9/2002 | Baar | 706/11 |
| 2003/0004846 A1 | 1/2003 | Schneider | 705/36 |

(Continued)

FOREIGN PATENT DOCUMENTS

DE    39 31 289 A1    4/1991

(Continued)

OTHER PUBLICATIONS

*Notification of Transmittal of the International Search Report and the Written Opinion of the International Searching Authority* for International Application No. PCT/US08/57027; 9 pages, Jun. 23, 2008.

*Primary Examiner*—James Kramer
*Assistant Examiner*—Rajesh Khattar
(74) *Attorney, Agent, or Firm*—Thomas Bradshaw

(57) ABSTRACT

A system for providing an operator interface having a radar display comprises a memory and a processor. The memory stores trader designated requirements. The processor generates a radar display comprising a trader requirements block that corresponds to the trader designated requirements. The processor receives market data and performs the following for each trader designated requirement: determines a probability of the market data satisfying a trader designated requirement, and displays a market data circle on the radar display, where a distance between the market data circle and the trader requirements block indicates the probability.

34 Claims, 3 Drawing Sheets

U.S. PATENT DOCUMENTS

| | | | |
|---|---|---|---|
| 2003/0004853 A1* | 1/2003 | Ram et al. | 705/37 |
| 2003/0065600 A1* | 4/2003 | Terashima et al. | 705/36 |
| 2003/0188748 A1 | 10/2003 | Sinderby et al. | 128/204.21 |
| 2004/0193524 A1 | 9/2004 | Almeida et al. | 705/36 |
| 2005/0041017 A1 | 2/2005 | de Brebisson | 345/169 |
| 2005/0044030 A1* | 2/2005 | Lockley et al. | 705/37 |
| 2005/0240501 A1 | 10/2005 | Huang | 705/37 |
| 2006/0224489 A1 | 10/2006 | Pantelis et al. | 705/37 |
| 2006/0253373 A1 | 11/2006 | Rosenthal et al. | 705/37 |
| 2007/0208654 A1 | 9/2007 | Stearns | |
| 2007/0276748 A1 | 11/2007 | Shapiro et al. | 705/37 |

FOREIGN PATENT DOCUMENTS

| | | |
|---|---|---|
| DE | 299 21 102 U1 | 5/2000 |
| EP | 0 118 125 A3 | 9/1984 |
| EP | 0 884 668 A1 | 12/1998 |

* cited by examiner

SYSTEM AND METHOD FOR PROVIDING AN OPERATOR INTERFACE FOR A RADAR DISPLAY OF MARKET DATA

TECHNICAL FIELD

This invention relates generally to the field of operator interface processing and more specifically to a system and method for providing an operator interface for a radar display of market data.

BACKGROUND

In recent years, electronic trading systems have gained widespread acceptance for trading a wide variety of items, such as goods, services, financial instruments, and commodities. For example, electronic trading systems may be used to trade stocks, fixed income securities, currencies, futures contracts, oil, and gold.

Electronic trading systems may provide information to traders. Specific types of displays may be used to provide the information. In some instances, certain displays may indicate relationships between market data and trading requirements of a trader.

SUMMARY OF THE DISCLOSURE

In accordance with the present invention, disadvantages and problems associated with previous techniques for displaying the probability that market data can satisfy trader designated requirements may be reduced or eliminated.

According to one embodiment of the present invention, a system for generating a radar display includes a memory and a processor. The memory stores trader designated requirements. The processor generates a radar display comprising a trader requirements block that corresponds to the trader designated requirements. The processor receives market data and performs the following for each trader designated requirement: determines a probability of the market data satisfying a trader designated requirement, and displays a market data circle on the radar display, where a distance between the market data circle and the trader requirements block indicates the probability.

Certain embodiments of the invention may provide one or more technical advantages. A technical advantage of one embodiment may be that a radar display may show the probability that market data (for example, the market price for a stock share) can satisfy a trader designated requirement specified by a trader (for example, the price at which the trader will buy the stock share). The radar display may include a trader requirements block that represents trader designated requirement and a market data circle that represents market data. The distance between a market data circle and the trader requirements block may indicate the probability that the market data can satisfy the trader designated requirement. For example, the closer the market data circle is to the trader requirements block, the greater the probability, and vice-versa. If the market data circle intersects the trader requirements block, then the market data satisfies the trader designated requirement. Accordingly, the radar display provides a graphical representation of the probability that market data can satisfy a trader designated requirement.

Another technical advantage of one embodiment may be that the trader may press a button of a game controller device to initiate a trade. The trader may initiate a trade when the market data circle intersects the trader requirements block. If the market data circle does not intersect the trader requirements block, the trader may use a joystick of the game controller device to move the trader requirements block to the market data circle. The trader may then initiate a trade by pressing the button. Accordingly, the trader may readily initiate a trade in accordance with the information presented in the radar display.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
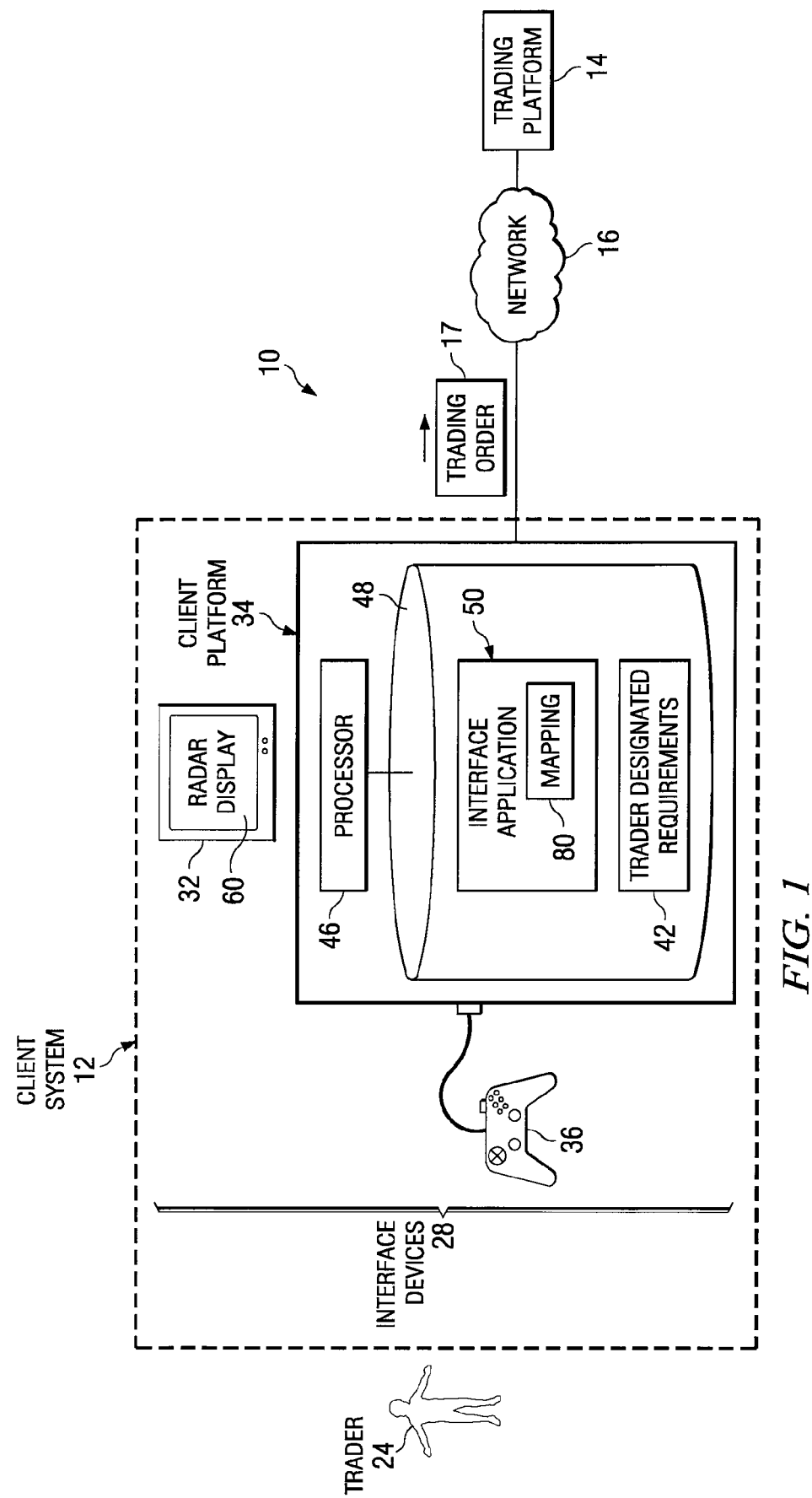
FIG. 1 illustrates one embodiment of an electronic trading system.
Figure 2:
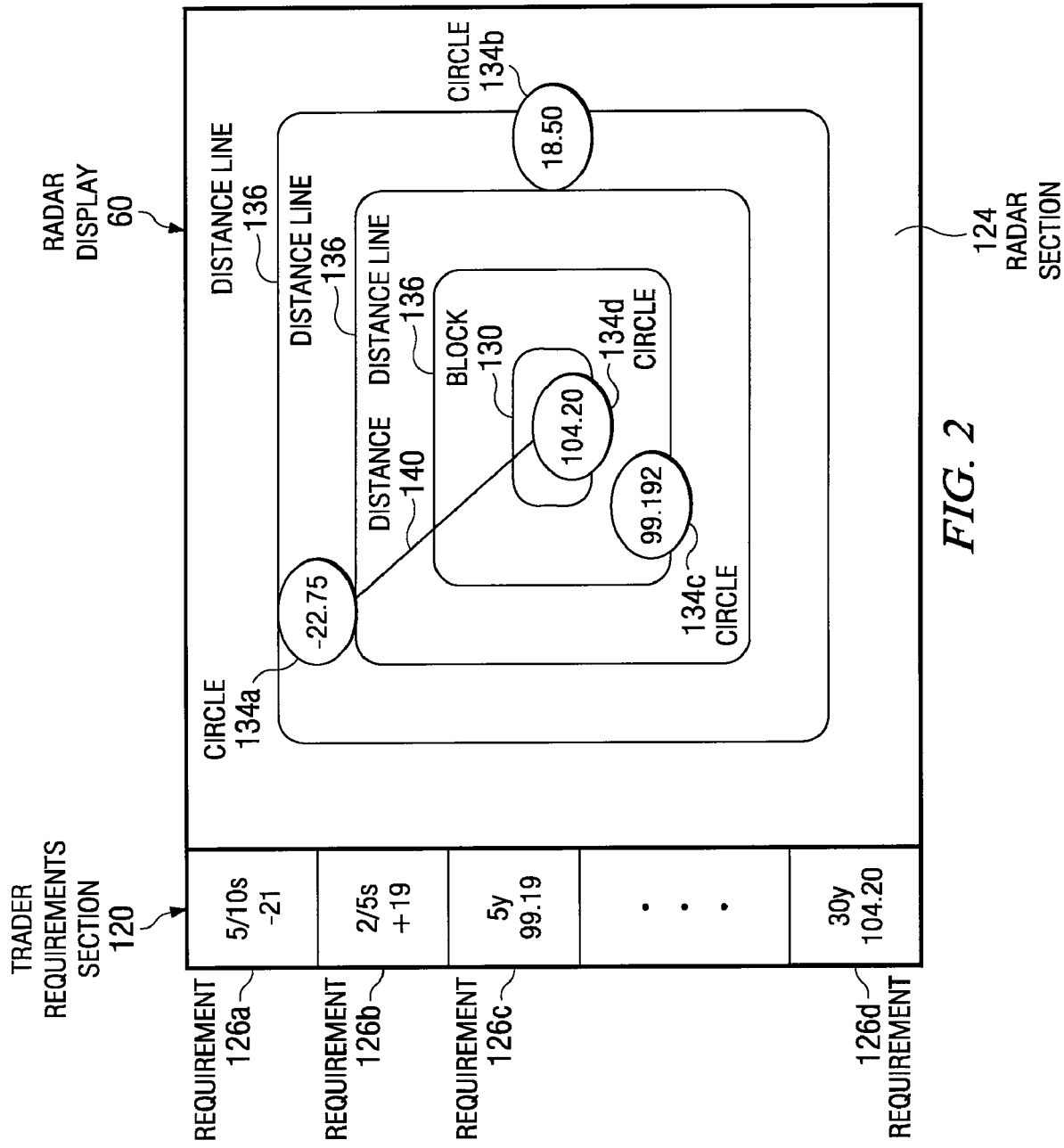
FIG. 2 illustrates an example of a radar display used in the system of FIG. 1.
Figure 3:
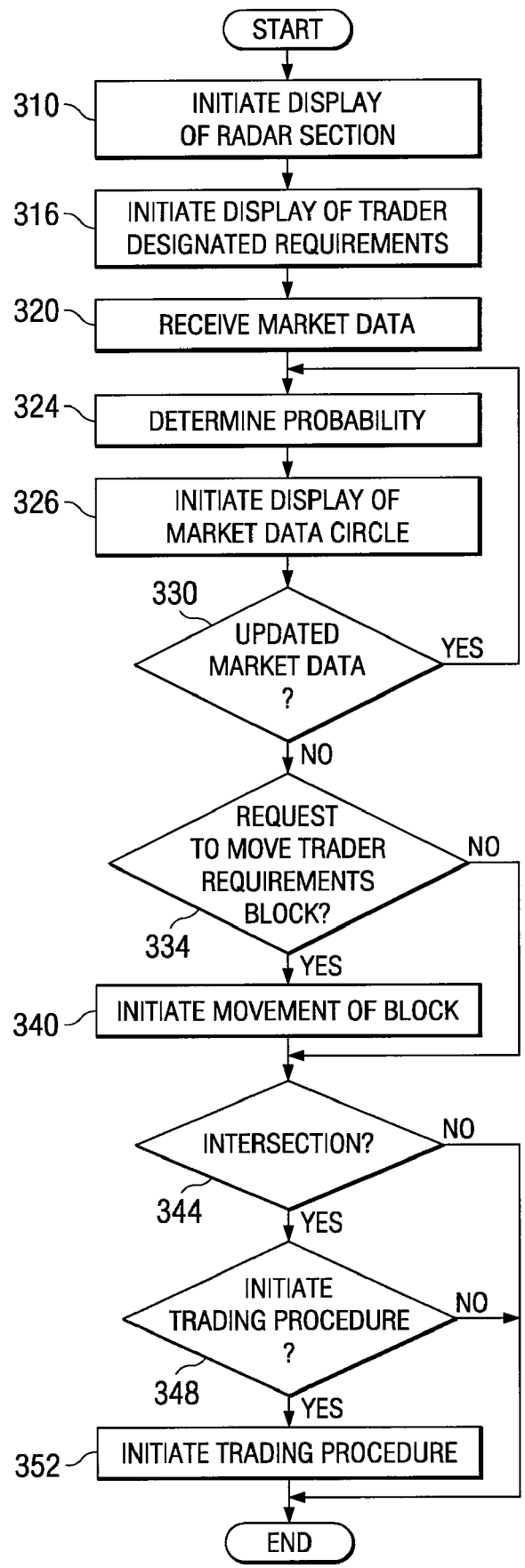
FIG. 3 illustrates one embodiment of a method for generating a radar display.

Embodiments of the present invention and its advantages are best understood by referring to FIGS. 1 through 3 of the drawings, like numerals being used for like and corresponding parts of the various drawings.

FIG. 1 illustrates one embodiment of an electronic trading system 10 and a trader 24. System 10 includes a client system 12, a trading platform 14, and a network 16 coupled as shown. Client system 12 includes interface devices 28 and a client platform 34. Interface devices 28 include a game controller device 36 and a display device 32 that displays a radar display 60.

In one example, trader 24 designates a requirement for a trade. For example, a trader designated requirement may specify to buy two shares of a particular trading product if the market price is $5.00 per share. Radar display 60 displays a trader requirements block that represents the trader designated requirement. Radar display 60 also shows a market data circle that represents market data for the trading product of the trader designated requirement. In the example, the market data may indicate the market price per share for the trading product.

In radar display 60, the distance between the market data circle and the trader requirements block indicates the probability that the market data can satisfy the trader designated requirements. In the example, if the market price is $50.00 per share, the market data circle may be farther away from the trader requirements block, but if the market price is $5.50 per share, the market data circle may be closer to the trader requirements block. If the market data circle intersects the trader requirements block, then the market data satisfies at least a portion of the trader designated requirement. In the example, if the market price is below $5.00 per share, the market data circle may intersect the trader requirements block. As the market data changes, the market data circle may move to reflect the changes.

Trader 24 may press a button of game controller device 36 to initiate a trade. Trader 24 may initiate a trade if the market data circle intersects the trader requirements block. If the market data circle does not intersect the trader requirements block, trader 24 may use a joystick of game controller device 36 to move the trader requirements block to the market data circle. Trader 24 may then press the button to initiate the trade. By moving the trader requirements block, trader 24 may change the requirements that trader 24 wishes to satisfy in order to make a trade.

Accordingly, radar display 60 provides a graphical representation of the probability that market data can satisfy a trader designated requirement, which allows trader 24 to more readily predict whether market data can satisfy requirements designated by trader 24. Furthermore, trader 24 may use a button and joystick of game controller device 36 to readily initiate a trade.

According to one embodiment, traders 24 may represent users of trading system 10 capable of placing and/or responding to trading orders 17. A trader 24 may represent a principal, an agent acting on behalf of a principal, an individual, a legal entity (such as a corporation), or any machine or mechanism that is capable of placing and/or responding to trading orders 17.

A trading order 17 may represent an order to buy or sell a particular amount of a particular trading product. A trading product may refer to any suitable product or combination of products that forms the basis of a given trading order 17. Examples of trading products may include any type of goods, services, financial instruments, commodities, equities, stocks, fixed income securities, interest rate derivatives, currencies, futures contracts, debentures, options, securities, derivative trading instruments, or any other suitable product or combination of products.

A client system 12 may represent any suitable end-user element that may be used to access one or more elements of trading system 10, such as trading platform 14. Examples of an end-user element include a computer, a workstation, a telephone, an Internet browser, an electronic notebook, a personal digital assistant (PDA), a pager, or any other suitable device (wireless or otherwise) capable of receiving, processing, storing, and/or communicating information with other components of system 10.

Client system 12 may include interface devices 28 and a client platform 34. An interface device 28 may represent any suitable device operable to communicate signals to and/or from client platform 34 via a wired and/or a wireless link. Examples of interface devices 28 may include input devices, output devices, and/or input/output devices. Examples of input devices include a game controller device 36, a keyboard, a mouse, a microphone, and/or another end-user element. Game controller device 36 represents any suitable input device that communicates with client platform 34. Examples of game controller devices 36 include video game controllers such as a joystick or a gamepad. An example of an output device includes a display device 32 that displays output information in a display 60. Examples of display devices 32 include a computer display, a CRT monitor, or a television.

Client platform 34 includes a processor 46 and a memory 48 coupled as shown. Processor 46 comprises any suitable combination of hardware and/or software to perform the functions described herein, including processing data associated with trading system 10, which may involve executing coded instructions associated with interface application 50.

Memory 48 comprises any suitable combination of volatile and/or non-volatile memory that stores and/or facilitates retrieval of information. According to the illustrated embodiment, memory 48 stores trader designated requirements 42 and an interface application 50. According to one embodiment, a trader designated requirement 42 may define a trading strategy for trader 24. A requirement 42 may specify an action to take (such as make a trade), if a certain condition is met. For example, a trader designated requirement 42 may specify to buy two shares of a trading product if the market price is $5.00 per share. In the example, a market price that is $5.00 per share would satisfy the trader designated requirement. Other examples of requirements 42 are described with reference to FIG. 2.

Interface application 50 may represent an application that allows interface devices 28 to receive and/or transmit information. For example, interface application 50 may include a graphical user interface (GUI) application that generates display 60 on display device 32. In the example, interface application 50 may change display 60 in response to commands from interface devices 28 and/or trading platform 14. In the example, interface application 50 may also send messages to interface devices 28 and/or trading platform 14 in response to commands from interface devices 28 and/or trading platform 14.

In the illustrated embodiment, interface application 50 includes a mapping module 80. Mapping module 80 maps signals received from interface devices 28 and/or trading platform 14 with commands of trading system 10. In one example, a signal may be sent by trader 24 moving a joystick, pressing a button, and/or performing any other manipulation of an interface device 28. In the example, a command may comprise a system command and/or a trading command. A system command may be used to alter display 60, for example, to move a cursor. A trading command may be communicated to or from trading platform 14 to, for example, initiate and/or process a trade.

Signal relationships may be used to associate a signal with a command. As an example, a manipulation (such as moving a joystick) may be associated with one command (such as moving a cursor). As another example, multiple manipulations (such as moving a joystick and pressing a button) may be associated with one command (such as sending a trading order request). As another example, a manipulation (such as pressing a button) may be associated with multiple commands (such as sending a trading order request and updating a display).

Trading platform 14 may represent a trading architecture that facilitates the processing of trading orders 17. Trading platform 14 may be configured at a management center or a headquartering office for any person, business, or entity that seeks to manage the trading of orders. Trading platform 14 may include any suitable combination of logic, personnel, devices, or entities that may be utilized to perform the operations of an administrative body or a supervising entity that manages or administers a trading environment.

A network 16 may represent a communication platform operable to exchange information. A communication network may comprise at least a portion of a plain old telephone system (POTS), a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Modifications, additions, or omissions may be made to trading system 10 without departing from the scope of the invention. The components of trading system 10 may be integrated or separated according to particular needs. Moreover, the operations of trading system 10 may be performed by more, fewer, or other modules.

FIG. 2 illustrates an example of a radar display 60 that may be generated by trading system 10 of FIG. 1. Radar display 60 may include a trader designated requirements section 120 and a radar section 124. Trader designated requirements section 120 displays trader designated requirements 126. As described previously, a trader designated requirement 126 may specify an action to take (such as make a trade), if a condition is met. Conditions may state a trader's desired prices, yields, spreads, trading volume, other trading condition, or any combination of any of the preceding. For example, a condition may state that a trader's desired price per share for a particular trading product is $5.00.

According to the illustrated embodiment, trader designated requirement 126a specifies that if there is a spread of −21 basis points (bps) between 5-year notes and 10-year notes, then buy the yield curve (buy 5-year notes and sell 10-year notes); trader designated requirement 126b specifies that if there is a spread of +19 bps between 2-year notes and 5-year notes, then buy the yield curve (buy 2-year notes and sell 5-year notes); trader designated requirement 126c specifies that if the price for 5-year notes is $99.19, then buy the 5-year note; and trader designated requirement 126d specifies that if the price for 30-year notes is $20.00, then buy the 30-year note. These and/or other examples could form trader designated requirements 126.

According to the illustrated embodiment, radar section 124 includes a trader requirements block 130, one or more market data circles 134, and one or more distance lines 136. Trader requirements block 130 represents one, some, or all trader designated requirements 126. Trader requirements block 130 may have any suitable size, shape, orientation, and location. According to the illustrated embodiment, trader requirements block 130 may have a substantially rectangular shape located at substantially the center of the distance lines 136.

Market data circles 134a-d represent market data. Each market data circle 134a-d may represent market data that can be used to determine whether a corresponding trader designated requirement 126a-d can be satisfied. For example, a trader designated requirement 126 may specify to buy two shares of a trading product if the market price per share is less than $5.00. A market data circle 134 may represent the market price per share of the trading product. In the illustrated example, market data circle 134a corresponds to trader designated requirement 126a, circle 134b corresponds to requirement 126b, circle 134c corresponds to requirement 126c, and circle 134d corresponds to requirement 126d.

In the illustrated embodiment, market data circle 134a shows a spread of −22.75 between buying 5-year notes and selling 10-year notes; circle 134b shows a spread of +18.50 between buying 2-year notes and selling 5-year notes; circle 134c shows a buy price of 99.192 for 5-year notes; and circle 134d shows a buy price of 20 for 30-year notes. Market data circles 134 may have any suitable shape, size, and orientation. According to the illustrated embodiment, market data circles 134 have substantially oval shapes.

A distance 140 between market data circle 134 and trader requirements block 130 indicates the probability that market data will satisfy trader designated requirements 42. According to one embodiment, a shorter distance 140 may indicate a greater probability, while a longer distance 140 may indicate a smaller probability. For example, in the illustrated embodiment, market data circle 134d is closer than market data circle 134a to trader requirements block 130, indicating that the trader designated requirement 126d is more likely to be satisfied than the trader designated requirement 126a.

Distance lines 136 may indicate distance from trader requirements block 130 and may have any suitable form. According to the illustrated embodiment, distance lines 136 may be concentric rectangles.

The probability that market data will satisfy a particular trader designated requirement 42 may be determined in any suitable manner. According to one embodiment, the probability may be determined from differences between the trader designated requirements and market data. In one example, if two market prices are greater than a trader designated price, but one is closer to the trader designated price than the other is, then the closer one may have a higher probability of satisfying the trader designated price. A distance metric, for example, a Cartesian distance metric, may be used to calculate the difference. The probability may be weighted and/or normalized.

According to one embodiment, the probability may also take into account one or more mitigating factors. Mitigating factors may increase or decrease the difficulty of satisfying a trader designated requirement. As an example, satisfying a trader designated requirement may be more difficult if the requirement requires more trades. As another example, satisfying a trader designated requirement may be more difficult if the requirement involves a market in which it is difficult to execute trades, such as a non-electronic market. Trader designated requirements that are more difficult to satisfy may have a smaller probability.

Market data circle 134 may move as the market data represented by market data circle 134 changes. For example, as the market data moves closer to satisfying the trader designated requirements, market data circle 134 may move closer to trader requirements block 130. As the market data moves farther away from satisfying the trader designated requirements, market data circle 134 may move farther away from trader requirements block 130.

According to one embodiment, a market data circle 134 for a trader designated requirement 126 that partially or completely intersects trader requirements block 130 may indicate that the market data satisfies the corresponding trader designated requirement 126. In the illustrated embodiment, market data circle 134d indicates that the market data satisfies trader designated requirement 126d.

Radar display 60 may be used to initiate a trade. A trade may refer to a procedure for placing and/or responding to a trading order 17. Examples of trades include bidding, buying, offering, selling, or performing any combination of any of the preceding. A bid procedure places a bid for a trading product; a buy procedure places a buy order to buy a trading product; an offer procedure places an offer for a trading product; and a sell procedure places a sell order to sell a trading product.

Trades may be initiated in any suitable manner. According to one embodiment, a trader 24 may initiate a trade by, for example, pushing a button of game controller device 36. As an example, a market data circle 34 moves into trader requirements block 130, indicating that market data satisfies a corresponding trader designated requirement 126. In response, trader 24 may push the button to initiate a trade. As another example, a particular market data circle 34 might not be in trader requirements block 130, but trader 24 may wish to initiate a trade anyway. Trader 24 may use a joystick of game controller device 36 to move trader requirements block 130 to the particular market data circle 134. By moving the trader requirements block, trader 24 may change the trader designated requirements for the market data circles 134. When trader requirements block 130 reaches the particular market data circle 134, trader 24 may then push the button to initiate a trade.

According to another embodiment, rules may be defined to automatically initiate a trade for a trader designated requirement 126 if a market data circle 134 for the trader designated requirement 126 intersects trader requirements block 130.

Modifications, additions, or omissions may be made to radar display 60 without departing from the scope of the invention. Radar display 60 may include more, less, or other data. Additionally, the data may be arranged in any suitable manner without departing from the scope of the invention.

FIG. 3 illustrates an example of a method for generating a radar display 60. The method begins at step 310, where interface application 50 initiates display of radar section 124 of radar display 60. Radar section 124 includes trader requirements block 130 representing trader designated requirements 126. Display of trader designated requirements 126a-d is initiated at step 316. Market data is received at step 320. The probability that the market data satisfies the trader designated requirements 126a-d is determined at step 324.

Display of market data circles 134 is initiated at step 326. The distance between a market data circle 134 and trader requirements block 130 may indicate the probability that the market data satisfies a corresponding trader designated requirement 126. For example, if the market is more likely to satisfy trader designated requirement 134d than trader designated requirement 134a, then market data circle 134d may be closer than market data circle 134a is to trader requirements block 130.

Updated market data may be received at step 330. If updated market data is received, the method returns to step 324, where the probability of the updated market data satisfying the trader designated requirements 126 is determined. If no updated market data is received at step 330, the method proceeds to step 334.

A request to move trader requirements block 130 may be received from trader 24 at step 334. If a request is received at step 334, the method proceeds to step 340, where trader requirements block 130 is moved. If no request is received at step 334, the method proceeds directly to step 344.

A market data circle 134 may partially or completely intersect trader requirements block 130 at step 344. The intersection indicates that the market data represented by market data circle 134 satisfies a trader designated requirement 126. If there is an intersection at step 344, the method proceeds to step 348.

A trade may be initiated at step 348. A trade may be initiated in any suitable manner. As an example, a trader 24 may initiate a trade using game controller device 36. As another example, rules may designate that a trade is automatically initiated if a market data circle 134 intersects trader requirements block 130. If a trade is to be initiated at step 348, the method proceeds to step 352, where the trade is initiated. The method then ends. If there is no target 134 in trader requirements block 130, or if no trade is to be initiated at step 348, the method ends.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system for providing an operator interface having a radar display, comprising:

a processor; and a memory that stores (1) a plurality of trader designated requirements and (2) instructions which, when executed by the processor, direct the processor to:

generate a radar display, the radar display comprising a trader requirements block corresponding to the plurality of trader designated requirements, each trader designated requirement comprising a requirement concerning at least one of a purchase and sale of a quantity of at least one financial instrument, in which at least one of the trader designated requirements defines a targeted difference in price between two different financial instruments, in which the difference in price comprises a trader-specified difference in price between two different financial instruments for a targeted spread transaction;

receive market data, in which the market data comprises price information for at least one of the two different financial instruments; and perform the following for each trader designated requirement:

determine a probability of the market data satisfying the respective trader designated requirement, in which the probability comprises a likelihood that the market data will satisfy the respective trader designated requirement, and in which the act of determining a probability for the at least one of the trader designated requirements comprises determining a probability that the trader-specified difference in price between the two different financial instruments will be satisfied;

determine a distance between a display of a market data circle and the trader requirements block based on the probability; and display a market data circle at a location on the radar display that is the determined distance away from the trader requirements block of the radar display, the market data circle corresponding to the respective trader designated requirement, in which the determined distance between the market data circle and the trader requirements block indicates the determined probability.

2. The system of claim 1, in which the instructions, when executed by the processor, further direct the processor to:

transmit a signal to a display device that causes the display device to display the one or more trader designated requirements.

3. The system of claim 1, wherein a trader designated requirement of the one or more trader designated requirements specifies performing at least one of the following:

buy;

sell;

offer; and bid.

4. The system from claim 1, wherein the radar display further comprises:

a plurality of concentric two-dimensional distance lines, each distance line representing a particular distance from the trader requirements block such that the plurality of distance lines represent a plurality of different distances and a corresponding plurality of different probabilities.

5. The system of claim 1, in which the instructions, when executed by the processor, further direct the processor to:
move the trader requirements block with respect to at least one market data circle of the one or more market data circles.

6. The system of claim 1, in which the instructions, when executed by the processor, further direct the processor to:
determine that a market data circle at least partially intersects the trader requirements block; and
initiate a trade corresponding to the market data circle in response to the determination.

7. The system of claim 1, in which the instructions, when executed by the processor, further direct the processor to:
receive a request to initiate a trade; and
initiate the trade in response to the request.

8. A computer-readable storage medium that stores instructions which, when executed by a processor, direct the processor to:
generate by the processor a radar display, the radar display comprising a trader requirements block corresponding to one or more trader designated requirements, each trader designated requirement comprising a requirement concerning at least one of a purchase and sale of a quantity of at least one financial instrument, in which at least one of the trader designated requirements defines a targeted difference in price between two different financial instruments, in which the difference in price comprises a trader-specified difference in price between two different financial instruments for a targeted spread transaction;
receive by the processor market data, in which the market data comprises price information for at least one of the two different financial instruments; and
perform by the processor the following for each trader designated requirement:
determine a probability of the market data satisfying a trader designated requirement, in which the probability comprises a likelihood that the market data will satisfy the respective trader designated requirement, and in which the act of determining a probability for the at least one of the trader designated requirements comprises determining a probability that the trader-specified difference in price between the two different financial instruments will be satisfied;
determine a distance between a display of a market data circle and the trader requirements block based on the probability; and
display a market data circle at a location on the radar display that is the determined distance away from the trader requirements block of the radar display, the market data circle corresponding to the respective trader designated requirement, wherein a distance between the market data circle and the trader requirements block indicates the determined probability.

9. The computer-readable storage medium of claim 8, in which the instructions, when executed by the processor, further direct the processor to:
transmit a signal to a display device that causes the display device to display the one or more trader designated requirements.

10. The computer-readable storage medium of claim 8, wherein a trader designated requirement of the one or more trader designated requirements specifies performing at least one of the following:
buy;
sell;
offer; and
bid.

11. A method, comprising:
generating by a processor a radar display, the radar display comprising a trader requirements block corresponding to one or more trader designated requirements, each trader designated requirement comprising a requirement concerning at least one of a purchase and sale of a quantity of at least one financial instrument, in which at least one of the trader designated requirements defines a targeted difference in price between two different financial instruments, in which the difference in price comprises a trader-specified difference in price between the two different financial instruments for a targeted spread transaction;
receiving by the processor market data, in which the market data comprises price information for at least one of the two different financial instruments; and
performing by the processor the following for each trader designated requirement:
determining a probability of the market data satisfying a trader designated requirement, in which the probability comprises a likelihood that the market data will satisfy the respective trader designated requirement, and in which the act of determining a probability for the at least one of the trader designated requirements comprises determining a probability that the trader-specified difference in price between the two different financial instruments will be satisfied;
determining a distance between a display of a market data circle and the trader requirements block based on the probability; and
transmitting a signal to a display device that causes the display device to display a market data circle at a location on the radar display that is the determined distance away from the trader requirements block of the radar display, in which the determined distance between the market data circle and the trader requirements block indicates the probability.

12. The method of claim 11, further comprising:
transmitting a signal to the display device that causes the display device to display the one or more trader designated requirements.

13. The method of claim 11, wherein a trader designated requirement of the one or more trader designated requirements specifies performing at least one of the following:
buy;
sell;
offer; and
bid.

14. The method of claim 11, wherein the radar display further comprises:
a plurality of concentric two-dimensional distance lines, each distance line representing a particular distance from the trader requirements block such that the plurality of distance lines represent a plurality of different distances and a corresponding plurality of different probabilities.

15. The method of claim 11, further comprising:
transmitting a signal to the display device that causes the display device to move on the radar display the trader requirements block with respect to at least one market data circle of the one or more market data circles.

16. The method of claim 11, further comprising:
determining by the processor that a specific market data circle at least partially intersects the trader requirements block on the radar display; and initiating by the processor a trade corresponding to the specific market data circle in response to the act of determining that the specific market data circle at least partially intersects the trader requirements block on the radar display.

17. The method of claim 11, further comprising:
receiving by the processor a request to initiate a trade associated with a trader designated requirement; and
initiating by the processor the trade in response to the request.

18. A graphical user interface for a radar display, comprising:
a trader requirements block corresponding to a plurality of trader designated requirements, each trader designated requirement comprising a requirement concerning at least one of a purchase and sale of a quantity of at least one financial instrument, in which at least one of the trader designated requirements defines a targeted difference in price between two different financial instruments, in which the difference in price comprises a trader-specified difference in price between two different financial instruments for a targeted spread transaction, the trader requirements block being output by a processor so that it is displayed on the graphical user interface; and
a market data circle associated in a database with each trader designated requirement, each market data circle being output by the a processor so that it is displayed on the graphical user interface, in which each market data circle is determined based on market data received by the processor, the market data for the at least one of the trader designated requirements comprising price information for at least one of the two different financial instruments;
wherein, for each trader designated requirement, a respective determined display distance between the respective market data circle and the trader requirements block indicates a respectively determined probability of market data satisfying the respective trader designated requirement corresponding to the respective market data circle, the respective determined probability comprising a determined likelihood that the market data will satisfy the respective trader designated requirement, in which the probability determined for the at least one of the trader designated requirements comprises a determined probability that the trader-specified difference in price between the two different financial instruments will be satisfied,
in which each market data circle is displayed at a location on the radar display that is the respective determined display distance away from the trader requirements block of the radar display, in which the determined distance between the market data circle and the trader requirements block indicates the determined probability.

19. The graphical user interface of claim 18, further comprising:
a textual description of each of the one or more trader designated requirements.

20. The graphical user interface of claim 18, further comprising:
a plurality of concentric two-dimensional distance lines, each distance line representing a particular distance from the trader requirements block such that the plurality of distance lines represent a plurality of different distances and a corresponding plurality of different probabilities.

21. A system for generating a radar display, comprising:
means for generating a radar display, the radar display comprising a trader requirements block corresponding to one or more trader designated requirements, each trader designated requirement comprising a requirement concerning at least one of a purchase and sale of a quantity of at least one financial instrument, in which at least one of the trader designated requirements defines a targeted difference in price between two different financial instruments, in which the difference in price comprises a trader-specified difference in price between two different financial instruments for a targeted spread transaction;
means for receiving market data, in which the market data comprises price information for at least one of the two different financial instruments; and
means for performing the following for each trader designated requirement:
determining a probability of the market data satisfying a trader designated requirement, in which the probability comprises a likelihood that the market data will satisfy the respective trader designated requirement, and in which the act of determining a probability for the at least one of the trader designated requirements comprises determining a probability that the trader-specified difference in price between the two different financial instruments will be satisfied;
determining a distance between a display of a market data circle and the trader requirements block based on the probability; and
displaying a market data circle at a location on the radar display that is the determined distance away from the trader requirements block of the radar display, the market data circle corresponding to the respective trader designated requirement, wherein a distance between the market data circle and the trader requirements block indicates the determined probability.

22. The system of claim 1, in which the act of determining a probability of the market data satisfying a respective trader designated requirement comprises:
determining a probability of the market data satisfying the respective trader designated requirement based on a difference between the respective trader designated requirement and the market data.

23. The system of claim 22, in which the act of determining a probability of the market data satisfying a respective trader designated requirement comprises:
determining a probability of the market data satisfying the respective trader designated requirement based at least in part on whether the respective trader designated requirement requires use of a non-electronic market in order to satisfy the respective trader designated requirement.

24. The system of claim 1, in which the instructions, when executed by the processor, further direct the processor to:
determine that the market data satisfies one of the one or more trader designated requirements, in which a market data circle corresponding to the one of the one or more trader designated requirements at least partially intersects the trader requirements block; and
initiate a trade in response to the determination.

25. The system of claim 1, in which a first of the plurality of trader designated requirements defines a targeted difference in price between a first financial instrument and a second financial instrument, and in which a second of the plurality of trader designated requirements defines a targeted difference in price between a third financial instrument and a fourth financial instrument, in which the fourth financial instrument is different from the first financial instrument, the second financial instrument, and the third financial instrument.

26. The system of claim 1, in which at least a specific one of the plurality of trader designated requirements requires at least two different trades in order to satisfy the specific trader designated requirement.

27. The system of claim 1, in which at least one of the plurality of trader designated requirements requires at least one trade in a non-electronic market in order to satisfy the requirement, and in which the act of determining a probability comprises determining a probability that the at least one trade in the non-electronic market will be satisfied.

28. The system of claim 1, in which the act of determining the distance between a display of a market data circle and the trader requirements block based on the probability comprises:
   determining a weighted probability value; and
   determining the distance between a display of a market data circle and the trader requirements block based on the weighted probability value.

29. The system of claim 1, in which the act of determining the distance between a display of a market data circle and the trader requirements block based on the probability comprises:
   determining a normalized probability value; and
   determining the distance between a display of each respective market data circle and the trader requirements block based on the normalized probability value.

30. The system of claim 1, in which each trader designated requirement comprises one or more actions to take if one or more conditions is satisfied, in which the one or more conditions comprises one or more target prices, one or more target yields, one or more target spreads, one or more target trading volumes, and in which each of the one or more actions comprises at least one of buying or selling one or more quantities of at least one financial instrument.

31. The system of claim 30, in which the one or more conditions comprises one or more target yields.

32. The system of claim 30, in which the one or more conditions comprises one or more target trading volumes, and in which the act of determining a probability comprises determining a probability that the target trading volume will be satisfied.

33. The system of claim 1, in which at least a specific one of the plurality of trader designated requirements requires a trade of a first financial instrument and a trade of a second financial instrument different from the first financial instrument in order to satisfy the specific trader designated requirement, the second financial instrument being different from the first financial instrument, and in which the act of determining a probability for the at least specific one of the plurality of trader designated requirements comprises:
   determining a probability that the first financial instrument will achieve a first trader-specified price; and
   determining a probability that the second financial instrument will achieve a second trader-specified price.

34. The system of claim 1, in which one of the plurality of trader designated requirements comprises a trader-designated target price for a first financial instrument and a trader-designated target price for a second financial instrument that is different from the first financial instrument.

\* \* \* \* \*